United States Patent [19]

Fery et al.

[11] Patent Number: 4,623,772

[45] Date of Patent: Nov. 18, 1986

[54] APPARATUS AND METHOD FOR EDM POLISHING

[75] Inventors: Philippe Fery, Plan-les-Ouates; Roger Delpretti, Vernier, both of Switzerland

[73] Assignee: Charmilles Technologies S.A., Geneva, Switzerland

[21] Appl. No.: 631,447

[22] Filed: Jul. 16, 1984

[30] Foreign Application Priority Data

Dec. 16, 1983 [CH] Switzerland ............ 6722/83

[51] Int. Cl.⁴ ................ B23H 1/02; B23H 7/28
[52] U.S. Cl. ................ 219/69 M; 219/69 C; 219/69 V
[58] Field of Search ........... 219/69 V, 69 M, 69 C, 219/69 G

[56] References Cited

U.S. PATENT DOCUMENTS

| | | | |
|---|---|---|---|
| 3,591,761 | 7/1971 | Bederman | 219/69 G |
| 4,057,703 | 11/1977 | Pfau | 219/69 M |
| 4,134,807 | 1/1979 | Briffod | 219/69 M |
| 4,135,070 | 1/1979 | Pfau et al. | 219/69 M |
| 4,150,275 | 4/1979 | Wavre | 219/69 V |
| 4,247,749 | 1/1981 | Wavre | 219/69 M |
| 4,310,742 | 1/1982 | Pfau | 219/69 M |
| 4,323,749 | 4/1982 | Mazond et al. | 219/69 M |
| 4,400,606 | 8/1983 | Itoh et al. | 219/69 M |
| 4,427,871 | 1/1984 | Drushel et al. | 219/69 C |
| 4,467,167 | 8/1984 | Oizumi et al. | 219/69 C |
| 4,476,369 | 10/1984 | Inoue | 219/69 V |

Primary Examiner—Clarence L. Albritton
Assistant Examiner—Geoffrey S. Evans
Attorney, Agent, or Firm—Hauke & Patalidis

[57] ABSTRACT

A method and apparatus for polishing a workpiece by electrical discharges by way of an electrode tool, machining pulses of relatively low power being obtained from a machining pulse generator. A cross-slide table provides the workpiece with a translation cyclical motion during polishing. Input control circuits enable the machine operator to program a chosen speed of translation for the cyclical motion, the radius of circular translation and the time of duration of machining. A counter counts the number of cycles being effected and a discriminator stops the pulse generator as soon as the chosen number of desirable cycles is obtained, such number being inversely proportional to the amplitude chosen for the translation motion.

2 Claims, 4 Drawing Figures

APPARATUS AND METHOD FOR EDM POLISHING

BACKGROUND OF THE INVENTION

The present invention relates to a method and apparatus for polishing a workpiece by electrical discharges by means of an electrode tool, for achieving a smooth surface finish on the workpiece.

It is known, in electrical discharge machining, to effectuate consecutive finishing passes by displacing the workpiece and electrode tool according to a relative cyclical translation motion in a plane perpendicular to the direction of feed of the electrode tool into the workpiece, the finishing passes being effected with electrical discharges of progressively decreasing intensity. The quality of the finished surface thus obtained has a limit which does not always correspond to industrial requirements, more particularly for obtaining a surface having craters of less than 0.1 microns in average value.

A process is known for polishing, by electrical discharge machining, a workpiece electrode by means of an electrode tool, wherein the electrodes are displaced according to a relative cyclical motion of translation at a predetermined amplitude, while supplying across the electrodes consecutive electrical discharges of a predetermined intensity, the amplitude of the translation motion being chosen as a function of the decrease of dimensions of the electrode tool relative to that of the surfaces to be polished.

SUMMARY OF THE INVENTION

The present invention has for principal object to achieve the best available surface finish under predetermined starting conditions. The duration of the polishing operation has a positive effect upon the surface finish which is obtained. It is evident that if the polishing operation is too short it is not possible to obtain an optimum surface finish. However, if the polishing operation is continued until the best surface finish has been obtained, a progressive deterioration of the machined surface is observed beyond that point.

The present invention permits to automatically obtain the best surface finish which is possible to achieve, as a result of adjusting the speed of translation to a predetermined value and effecting a number of translation cycles inversely proportional to the amplitude of motion chosen.

The invention also provides an apparatus for practicing the method of the invention.

A better understanding of the invention will be obtained from a reading of the following description of the best mode contemplated for practicing the invention, when read in conjunction with the accompanying drawing given for illustrative purpose only, and wherein:

DETAILED DESCRIPTION OF THE PREFERRED EMBODIMENT

Figure 1:
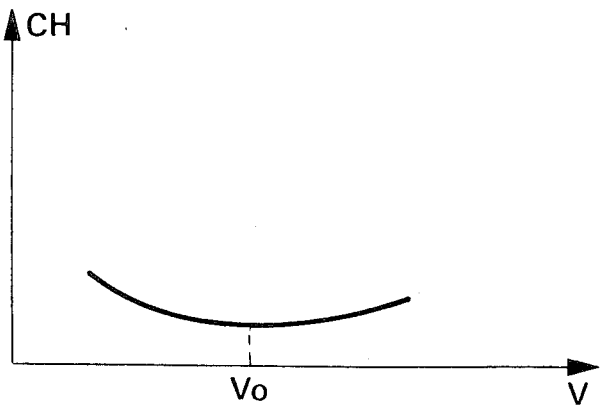
FIGS. 1 and 2 are graphs of surface finish quality as a function of two parameters.

Referring to FIG. 1, there is illustrated a curve of surface roughness CH as a function of the tangential velocity V of circular translation. The latter is equal to the product of the angular velocity $\omega$ by the amplitude R of translation. The curve shows that the minimum roughness is obtained at a predetermined tangential velocity Vo.

Figure 2:
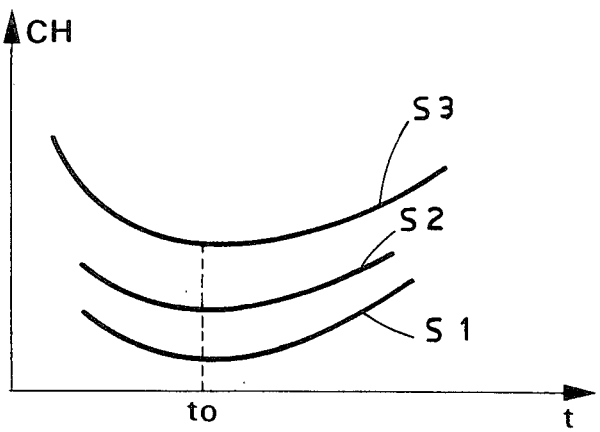

At FIG. 2, there is illustrated a curve of the surface roughness CH as a function of the duration to of machining for different qualitative values of the machined surface at diverse selected values Vo of tangential velocity. The curve S1 relates to a small surface area, while the curves S2 and S3 relate to surface areas which are comparatively larger. It is surprising to observe that each of the curves provide a minimum roughness for a machining duration to which is independent of the machined surface area. Practically, the time duration to has an optimum value of the order of 60 minutes, but it is clear that the optimum duration could vary more or less from the optimum value according to the machining conditions, more particularly according to the materials of which the two electrodes, workpiece and tool, are made.

According to a practical example, the tangential velocity Vo in the curve according to FIG. 1 is 1,500 microns/min. and, for a machining duration to of 60 minutes, the product Voto is equal to 90,000. As the velocity Vo must remain independent from the radius of circular translation motion, it is clear that the number of cycles by minutes of the translation motion must be adjusted according to an inverse function of the chosen amplitude. Similarly, the total number of cycles to be effected in order to obtain the machining duration to is similarly an inverse function of the chosen amplitude.

In the example hereinbefore given wherein the product of the number of cycles by the translation amplitude is equal to 90,000, 900 translation cycles must be effected if an amplitude of 100 microns has been chosen in order to achieve a velocity Vo of 1,500 microns/min. simultaneously with a machining duration of 60 minutes.

Figure 3:
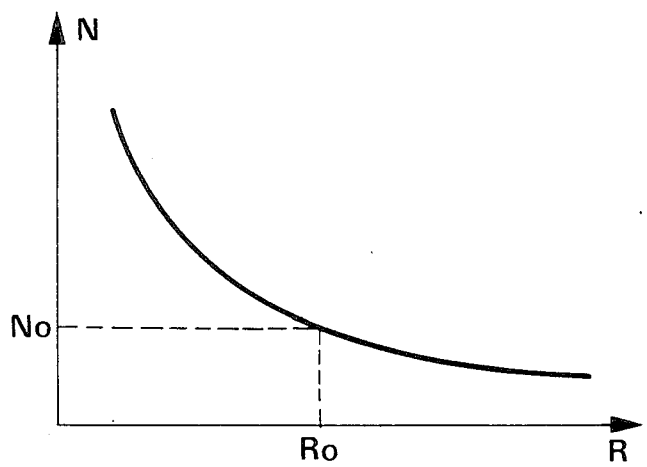
FIG. 3 is a graph illustrating a typical relationship between parameters according to the method of the invention.

The curve illustrated at FIG. 3 shows the relationship that must be maintained between the number of machining cycles N and the amplitude R of the translation motion in order to achieve a machining duration to at a velocity Vo, i.e. under the machining conditions permitting to obtain the best possible surface finish.

As the product Voto defines the total distance travelled by a single point of the electrode in the course of a machining operation, it is clear that the product Voto is also equal to $2\pi RN$, wherein R is the radius of the circular translation motion and N is the total number of cycles. Thus, in order to achieve optimum conditions, R and N must vary according to the inverse function illustrated at FIG. 3. Therefore, after having chosen the value of R, the function permits to determine the number N of translation cycles to be effected in order to achieve the best possible surface finish.

Figure 4:
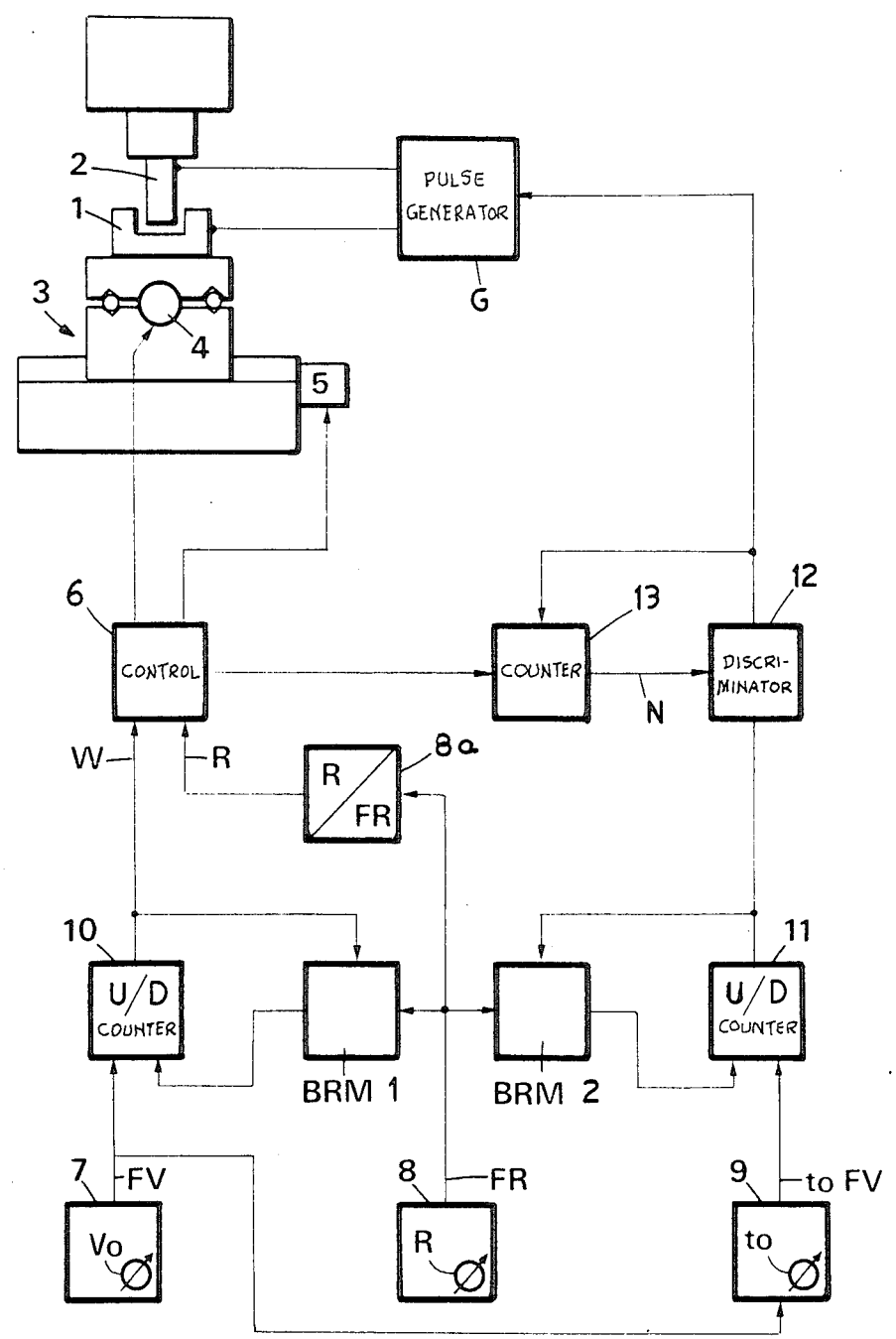
FIG. 4 is a schematic representation of an apparatus for practicing the method of the invention.

The apparatus illustrated at FIG. 4, for machining by electrical discharges, obtained from a pulse generator G, a workpiece 1 by means of an electrode tool 2, comprises a cross-slide table 3 driven by two stepping motors 4 and 5 which are controlled by a circuit 6 responding to two signals corresponding to the preset values of ω and R, representing respectively the angular velocity and the radius of translation motion.

The circuit for developing the two control signals and for obtaining a command signal stopping the machining operation at the moment the best possible surface finish is obtained comprises three programmable instruction input elements 7, 8 and 9 illustrated at the bottom of FIG. 4. The input element 7, providing the instruction relating to the tangential velocity Vo, consists of a pulse generator supplying pulses FV at a frequency proportional to the chosen tangential velocity. The input element 8 is also a pulse generator providing pulses FR at a frequency which is proportional to the chosen amplitude R of translation. Finally, the input element 9, accepting the parameter to, is a frequency multiplier which supplies pulses at a frequency proportional to the frequency FV supplied by the pulse generator 7 multiplied by the time to chosen for the duration of machining. The frequency multiplier 9 thus supplies at its output pulses at a frequency toFV.

The pulse signal FV at the output of the pulse generator 7 is applied to an input of an up-down counter 10 whose content is indicated by a digital signal W applied to an input of the control circuit 6 for the stepping motors 4 and 5, the other input of the control circuit 6 receiving the output signal of the pulse generator 8 via a converter unit 8a. The same signal W is also applied to a binary rate multiplier BRM1, whose multiplication rate is determined by the signal W.

Another input of the binary rate multiplier BRM1 receives the pulses FR supplied by the pulse generator 8 at a frequency defining the desired amplitude of translation. The signal at the output of the binary rate multiplier BRM1 is therefore equal to the product of the frequency FR by the multiplication rate ω and the signal ω FR is applied to the down-counting input of the counter 10. The pulses of frequency FV applied to the up-counting input of the counter 10 increase the value of the digital signal at its output until the pulses at the output of the binary rate multiplier BRM1 reach the same frequency as FV and, consequently, the output signal is stabilized. At this time, the digital signal defines ω, because FV=ωFR, which is the same as the relationship Vo=ωR.

An arrangement similar to that determining the digital representation of the value of ω is included in the circuit of FIG. 4 for providing a digital signal representative of the number of translation cycles to be effected. Such an arrangement comprises an up-down counter 11 having an input receiving the signal toVF from the frequency multiplier 9 and another input receiving the signal from the output of a second binary rate multiplier BRM2 whose multiplication rate is provided by the digital signal at the output of the up-down counter 11.

Under such conditions, the signals at the output of the up-down counter 11 represent a value proportional to the total length of travel of any point of the electrode tool during the total machining time. In effect, the input connected to the frequency multiplier 9 receives a signal representing the multiplication of to by the tangential velocity of translation, such that in order to obtain an equilibrium of the up-down counter 11, the output signal from the binary rate multiplier BRM2 must correspond to the length of one translation cycle, 2πR, multiplied by the total number N of translation cycles. In the equlibrium state of the up-down counter 11, the digital signal at its output thus defines 2πN. Such output signal is applied to an input of a discriminator 12 having another input receiving from a counter 13 a signal proportional to N, obtained by counting the cycles of translation at the output of the stepping motor control circuit 6. When the number of cycles reaches the number of cycles set by the counter 11, the discriminator 12 provides a signal at its output which is applied to the pulse generator G to stop machining, and to the counter 13 to reset it to zero.

The apparatus hereinbefore described thus permits to automatically terminate the polishing operation at the end of the optimum time duration to. In addition, the optimum velocity Vo being provided by the programmable input element 7, the translation angular velocity is calculated by taking into consideration the amplitude R which has been chosen for the translation motion.

It will be readily apparent to those skilled in the art that, in FIG. 4, the elements 9, 11, 12, 13 and the second binary rate multiplier BRM2 could be replaced by an elapsed time counter capable of cutting off the machining pulse generator G after passage of the predetermined timer period to, which is the equivalent of setting the total number of translation cycles.

The choice of the translation amplitude is effected by the machine operator as a function of the work to be accomplished. As an example, for polishing a medal, a translation radius of 20 microns may be chosen, while, for polishing a large workpiece having a uniform surface, a translation radius of the order of 800 microns may advantageously be chosen.

It will be further appreciated by those skilled in the art that the translation motion may not necessarily be circular, and that the same principle of operation may be applied to different types of translation paths, for example to rectangular or eliptical paths. The example of operation described herein relates to polishing the surface of the workpiece 1 by means of the frontal surface of the electrode tool 2, but it will be understood that the same principles are used for polishing the lateral walls of the workpiece 1. It is to be noted that it is preferable to apply machining pulses of relatively low power across the workpiece and electrode tool, and to maintain the machining fluid in the machining zone without supplying fresh machining fluid to the machining zone, in order to obtain the best surface finishes.

Having thus described the present invention by way of a typical example of structure well designed for practicing the method of the invention, modification whereof will be apparent to those skilled in the art, what is claimed as new is as follows:

We claim:

1. An apparatus for polishing by electrical discharges an electrode workpiece having a surface of predetermined dimensions by means of an electrode tool of predetermined dimensions, wherein the electrode workpiece and the electrode tool are displaced relative to each other according to a cyclical translation motion of a predetermined amplitude and tangential velocity while applying across the electrodes consecutive electrical discharges of predetermined power, the amplitude of the translation motion being chosen as a function of the dimensions of the electrode tool relative to the dimensions of the surface of the electrode workpiece to be polished, said apparatus comprising a mechanism for effecting said cyclical translation motion between said electrodes, means for presetting the amplitude and the tangential velocity of the translation motion at predetermined values, means for applying electrical discharges of predetermined power between said electrodes, a logic circuit for calculating the number of cycles of translation motion to be effected as an inverse function of the amplitude of said translation motion, counting means for counting the number of cycles of translation motion effected in the course of applying said electrical discharges, and control means for interrupting said electrical discharges when the counted number of cycles of translation motion is equal to the calculated number of cycles of translation motion and for resetting said counting means to zero.

2. A method for polishing by electrical discharges an electrode workpiece having a surface of predetermined dimensions by means of an electrode tool of predetermined dimensions, wherein the electrode workpiece and the electrode tool are displaced relative to each other according to a cyclical translation motion of a predetermined amplitude and tangential velocity while applying across the electrodes consecutive electrical discharges of predetermined power, the amplitude of the translation motion being chosen as a function of the dimensions of the electrode tool relative to the dimensions of the surface of the electrode workpiece to be polished, said method comprising effecting said cyclical translation motion between said electrodes, presetting the amplitude and the tangential velocity of the translation motion at predetermined values, applying electrical discharges of predetermined power between said electrodes, calculating the number of cycles of translation motion to be effected as an inverse function of the amplitude of said translation motion, counting the number of cycles of translation motion effected while applying said electrical discharges, and interrupting said electrical discharges when the calculated number of cycles of translation motion and the number of effected cycles of translation motion are equal.

* * * * *